Nov. 8, 1966 G. A. MAY 3,284,697
EXPONENTIAL FUNCTION POTENTIOMETER
Filed Jan. 21, 1964
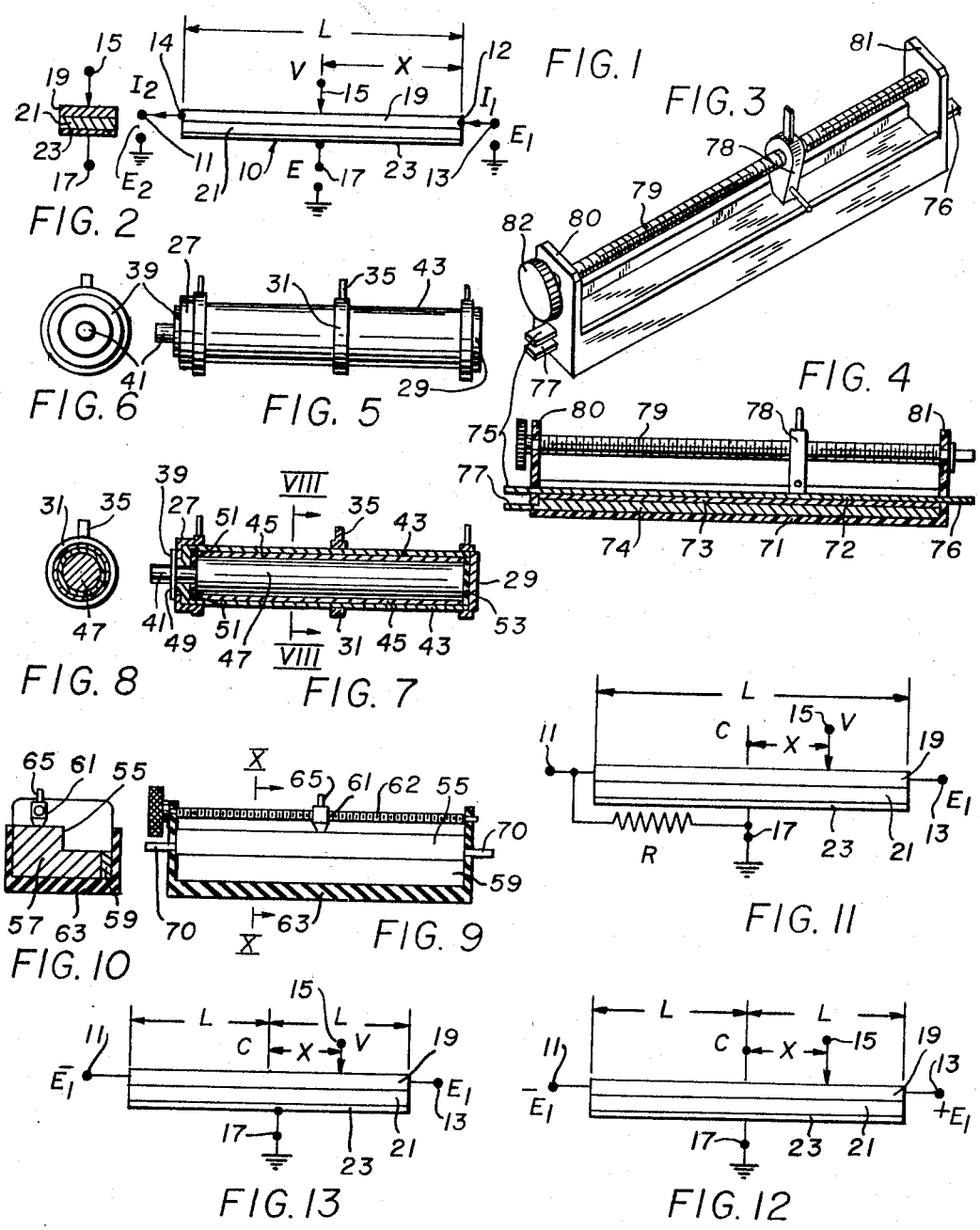
INVENTOR
GEORGE A. MAY
BY- Smart & Biggar
ATTORNEYS.

United States Patent Office 3,284,697
Patented Nov. 8, 1966

3,284,697
EXPONENTIAL FUNCTION POTENTIOMETER
George A. May, 1223 Richmond St., London,
Ontario, Canada
Filed Jan. 21, 1964, Ser. No. 339,120
13 Claims. (Cl. 323—74)

This invention relates to a potentiometer for producing a voltage that is related to a linear or angular displacement by a function lying in the general class of exponential functions, viz. functions such as hyperbolic sine, hyperbolic cosine, and simple exponential functions.

In many scientific fields, it is necessary to produce a voltage which is some specific function of a mechanical movement. For example, it may be necessary in some cases to produce a linear voltage output in response to a linear mechanical input. Such voltage-displacement relationships are common in the servomechanism art, for example.

It is occasionally necessary to produce voltages which are related to displacements according to the following formula:

$$V = Ae^{kx} + Be^{-kx} + C \qquad (1)$$

where V is the voltage, $k$ is a constant of the device, and A, B and C are functions of the input voltages and the device parameters; $e$ is the base of natural longarithms and $x$ is the displacement to which the voltage is functionally related. Typical of voltage-displacement relationships of the above general form are the exponential function, and the hyperbolic sine and cosine functions.

In the present state of the art, conventional conductive film potentiometers are made by a variable density deposition of resistive material. In such a process, high precision is inherently difficult and expensive to achieve.

It is an object of the invention to provide potentiometers which produce voltages functionally related to a displacement according to the relationship:

$$V = Ae^{kx} + Be^{-kx} + C \qquad (1)$$

where the symbols are as defined above.

It is a further object of the present invention to provide a potentiometer which is simple in construction and relatively inexpensive to manufacture.

It is a further object of the invention to provide a potentiometer in which a linear displacement of the movable contact of the potentiometer is related to the voltage output of the potentiometer according to the relationship $$V = Ae^{kx} + Be^{-kx} + C \qquad (1)$$

where all symbols are as defined above.

The present invention therefore provides a potentiometer comprising three layers, one layer being a conductive layer such as a metal strip, the second layer being a resistive layer of uniform dimensions and in close contact with the conductive layer, and the third layer being another resistive layer in close contact with the first-mention resistive layer and of uniform dimensions. All three layers have substantially the same length. The movable contact of the potentiometer makes electrical contact with the resistive layer which is not in contact with the conductive layer. The fixed terminals of the device are attached to either end of the last-mentioned resistive layer, and a third fixed terminal is attached to the conductive layer thereby providing, with the movable contact, a four terminal device.

The potentiometer may be made by the deposition of uniform thin films of suitable material, by extrusion of conductive plastic or by any other process which achieves the geometry required by the following theory. The layers may be deposited on any form of surface geometry including a flat, cylindrical or stepped surface. In the case of the stepped surface the two layers take the form of two regions of different thickness (hence different resistance and conductance per unit length).

The invention will now be described with reference to the accompanying drawings in which:

FIGURE 1 is a simplified schematic diagram illustrating the principle of the invention;

FIGURE 2 is a cross-section of the device shown in FIGURE 1;

FIGURE 3 illustrates in perspective a practical embodiment of a potentiometer constructed according to the invention;

FIGURE 4 is a longitudinal cross-section view of the device shown in FIGURE 3;

FIGURE 5 is an alternative embodiment of a potentiometer constructed according to the invention;

FIGURE 6 is an end view of the device shown in FIGURE 5;

FIGURE 7 is a longitudinal cross-section of the device shown in FIGURE 5;

FIGURE 8 is a cross-section of the device shown in FIGURE 7 as seen along the line VIII—VIII.

FIGURE 9 is a view of a further practical embodiment of a potentiometer constructed according to the invention;

FIGURE 10 is a cross-section view of the device shown in FIGURE 9 along the line X—X;

FIGURE 11 is a simplified schematic diagram of a potentiometer according to the invention capable of giving an exponential voltage-displacement relationship;

FIGURE 12 is a simplified schematic diagram of a potentiometer constructed according to the invention and capable of reproducing a hyperbolic sine voltage displacement relationship; and FIGURE 13 is a simplified schematic diagram of a potentiometer constructed according to the present invention and capable of reproducing a hyperbolic cosine voltage-displacement relationship.

A schematic diagram of a potentiometer constructed according to the present invention is shown in FIGURE 1. The potentiometer, indicated generally by the numeral 10, includes a metal or other conductive layer 23, an intermediate resistive layer 21 in close contact with the conductive layer 23 and an upper resistive layer 19 in close contact with the intermediate resistive layer 21 but not in contact with the conductive strip 23. Each of the two resistive layers is of the same length, and each is of uniform cross-section and resistivity throughout its length, but the cross-section and resistivity of the two layers are not necessarily equal.

Attached to one end 14 of the upper resistive layer 19 is a terminal 11, and to the other end 12 of the layer 19 is attached a terminal 13. Another fixed terminal 17 is in contact with the conductive layer 23. A movable contact 15 is capable of movement along the surface of the upper resistive layer 19.

Input voltages $E_1$ and $E_2$ and E are applied to the terminals 13, 11 and 17 respectively. The voltage V which appears at the movable contact 15 is then given by the equation $$V = Ae^{\sqrt{\sigma\rho}x} + Be^{\sqrt{\sigma\rho}x} + E \qquad (2)$$

where A and B are constants dependent upon voltages $E_1$, $E_2$, $e$ is the base of natural longarithms, $\sigma$ is the conductance per unit length of the resistive layer 21 (the area conductance of the layer that is in contact with the uppermost resistive layer 19), $\rho$ is the resistance per unit length of the uppermost resistive layer 19, $x$ is the distance of the movable contact 15 from the end 12, and E is the voltage applied to the terminal 17 connected to the conductive layer 23.

The displacement $x$ is shown in the drawing as beginning from the end 12 of the potentiometer. However, the displacement $x$ might just as easily have been chosen to begin from the end 14 of the potentiometer. The differences which would result from a different choice of end would merely be alterations in the constants A and B in Equation 2.

The following theory provides a better understanding of the operation of the potentiometer and is developed in conjunction with FIGURES 1 and 2 of the drawings. The theory is premised on the provision of an equipotential layer 23 underlying the resistive layer 21.

$$V(x)E_1 - \int_0^x \rho I(x)dx \quad (3)$$

$$I(x) = I_1 - \int_0^x \sigma[V(x) - E]dx \quad (4)$$

$V(x)$ = voltage at $x$ (between contact 15 and ground)
$I(x)$ = current in the upper layer 19
$\rho$ = resistance per unit length of layer 19
$\sigma$ = conductance per unit length of layer 21 where both layers 19 and 21 have uniform and equal widths.

Differentiating Equations 3 and 4 by $x$ yields $$\frac{dV(x)}{dx} = -\rho I(x) \quad (5)$$

$$\frac{dI(x)}{dx} = -\sigma - E[V(x)] \quad (6)$$

differentiation of Equation 5 yields $$\frac{d^2V(x)}{dx^2} = -\rho \frac{dI(x)}{dx}$$
$$= -\rho[-\sigma < V(x) - E >]$$
$$= \rho\sigma[V(x) - E] \quad (7)$$

$$V(x) = C_1 e^{\sqrt{\rho\sigma}x} + C_2 e^{-\sqrt{\rho\sigma}x} + E \quad (8)$$

$$I(x) = \frac{1}{\rho}\frac{dV(x)}{dx} = -\left[C_1\sqrt{\frac{\sigma}{\rho}}e^{\sqrt{\rho\sigma}x} - C_2\sqrt{\frac{\sigma}{\rho}}e^{-\sqrt{\rho\sigma}x}\right] \quad (9)$$

where $C_1$ and $C_2$ are fixed by the boundary conditions.

First let us consider the infinite length case. The boundary conditions are $V(x)$, $I(x)$ finite at infinity since no power is generated by a passive device.

Therefore,
$$C_1 = 0 \text{ and}$$
$$C_2 = E_1 - E$$

(since setting $x=0$ we get $V(O) = C_2 + E = E_1$).

The resistance between terminals 13 and 17

$$= \frac{(E_1 - E)}{I_1} = \frac{(E_1 - E)}{(E_1 - E)\sqrt{\frac{\sigma}{\rho}}}$$

$$= \sqrt{\frac{\rho}{\sigma}}$$

Thus, a finite length device terminated by a resistor $$R = \sqrt{\frac{\rho}{\sigma}} \quad (10)$$

will simulate an infinite length device.

Let us now consider the finite length case in which voltages $E_1$, $E_2$, and $E$ are applied between terminals 13, 11 and 17 respectively, and ground.

The boundary conditions are $V(O) = E_1$ and $V(L) = E_2$ given by Equation 8 therefore $$V(O) = C_1 + C_2 + E = E_1 \text{ or } C_1 + C_2 = E_1 - E \quad (11)$$

$$V(L) = C_1 e^{\sqrt{\sigma\rho}L} + C_2 e^{-\sqrt{\sigma\rho}L} + E = E_2 \quad (12)$$

combining (10) and (11) and solving for $C_1$, $C_2$, we get $$C_1 = \left[\frac{(E_1 - E)e^{-\sqrt{\sigma\rho}L} - (E_2 - E)}{e^{-\sqrt{\sigma\rho}L} - e^{\sqrt{\sigma\rho}L}}\right] \quad (13)$$

$$C_2 = \left[\frac{(E_2 - E) - (E_1 - E)e^{\sqrt{\sigma\rho}L}}{e^{-\sqrt{\sigma\rho}L} - e^{\sqrt{\sigma\rho}L}}\right] \quad (14)$$

and $$I_1 = \sqrt{\frac{\sigma}{\rho}}(C_2 - C_1)$$

$$I_2 = \sqrt{\frac{\sigma}{\rho}}[C_2 e^{-\sqrt{\sigma\rho}L} - e^{\sqrt{\sigma\rho}L}]$$

Thus any function of the form $$Ae^{kx} + Be^{-kx} + C \quad (1)$$

can be generated where:

$k = \sqrt{\rho\sigma}$ and is a characteristic of the device
$A = C_1$, given by Equation 12
$B = C_2$, given by Equation 13
$C = E$ A and B being determined by $E_1$ and $E_2$ and E.

The values $E_1$, $E_2$ and $E$ can be obtained by external resistor potential-diverter networks (not shown) in a well known manner. It is interesting to note that if the $E_1$, $E_2$, $E$ are made variable the function of the generator can be changed at will (i.e. A, B and C are changed).

The device of FIGURE 11 is intended to reproduce the exponential function. This is accomplished by grounding the terminal attached to the conductive layer and connecting the resistor R as shown between the conductive layer terminal and one terminal of the upper resistive layer. The value of the resistor $$R = \sqrt{\frac{\rho}{n}} \quad (10)$$

The output voltage V appearing at the movable contact is then given by $$V(x) = E_1 e^{-\sqrt{\sigma\rho}x}$$

If, in FIGURE 11, the displacement were measured from the left end instead of the right end of the potentimeter, the voltage V would be given by $$V(x) = E_1 e^{-\sqrt{\sigma\rho}(L-x)}$$
$$= E_1 e^{-\sqrt{\sigma\rho}L} e^{\sqrt{\sigma\rho}x}$$

which is a positive exponential function.

To obtain the hyperbolic sine function, the potentiometer is connected as in FIGURE 12. In this figure, the voltage applied to one end of the upper resistive layer is equal and opposite to that applied to the other end. Again the conductive layer is grounded.

If 2L represents the length of each of the layers $$E_1 = E_2 \text{ for } C_1 = -C_2$$

then the voltage V appearing at the movable contact is obtained by inserting these values in Equation 8 thus $$V(x) = C(e^{kx} - e^{-kx})$$

$2L$ = the length of the resistive layers, and other symbols are as previously defined, except that $x$ is measured from the centre C of the device outwards.

The hyperbolic cosine function is obtained by connecting the device as shown in FIGURE 13. The connections are identical to those shown in FIGURE 12 and again the displacement $x$ is measured from the centre of the device. The only difference is that the voltage applied to one of the upper resistive layer terminals is exactly the same as the voltage applied to the other end. The voltage V at the movable contact is then obtained by inserting these values in Equation 8 thus $$V(x) = C(e^{kx} + e^{-kx})$$

where all symbols are as previously defined.

Practical embodiments of the invention are illustrated in FIGURES 3 to 10.

One such embodiment is shown in FIGURES 3 and 4. In this embodiment, the potentiometer is mounted in a suitable frame 71 in which two resistive layers 72 and 73 are deposited in close contact one above the other. The lower layer 73 is in contact with a conductive layer 74, preferably of metal, lying beneath the layer 73. The restitive layers and the conductive layer are long, narrow, rectangular strips of equal length, and the resistive layers are preferably thin, possibly only a few mils thick.

The upper resistive layer 72 is provided with terminals 75 and 76. The metal layer 74 is provided with a terminal 77. The movable contact in the device is provided by a wiper 78 whose lower extremity makes contact with the upper surface of the upper resistive layer 72. The wiper 78 is mounted on a threaded shaft 79 which is rotatably mounted in the ends 80 and 81 of the frame 71. By rotating the knob 82, which is attached to the threaded shaft 79, the wiper 78 is moved along the length of the upper resistive layer 72 and the output voltage appearing at the wiper 78 will vary according to Equation 2, if suitable input voltages are applied to terminals 75, 76 and 77. If desired, the shaft 79 may be a conductor, in which case the voltage output of the conducting wiper 78 may be obtained from either end of the shaft protruding from the ends 80 and 81 of the framework 71.

If it is desired to relate the voltage obtained from the wiper 78 to a mechanical input, this may be attained by attaching suitable gears or some other drive train to one end of the shaft 79, and linking the drive train to the desired mechanical input. Alternatively, the threaded shaft 79 may be replaced by a smooth shaft upon which the wiper 78 may slide, and the wiper 78 may be attached to a sliding mechanical drive mechanism.

The layers 72 and 73 may be formed by spraying upon the metal layer 74 a suitable resistive (but not insulating) plastic paint. It is, of course, necessary that uniform dimensions of the two resistive layers be obtained throughout their length, if the exponential voltage-displacement relationship is to be obtained without elaborate calibration. If desired, uniform flat strips of resistive material may be used instead of resistive paint. Vapour deposition techniques can also be used to form the layers.

The potentiometer according to the embodiment shown in FIGURES 5 to 8 includes a cylindrical metal core 47, a resistive cylindrical shell 45 surrounding the core 47 and in close contact with the core, and an outer resistive cylindrical shell 43 surrounding the inner resistive shell 45 and in close contact with the shell 45. In order that the cylindrical geometry closely approximate a superposition of plane layers, it is necessary that the two resistive layers be very thin relative to the overall dimensions. If this condition is not satisfied, the potentiometer will not perform as described. The thickness of the resistive layers is exaggerated in the drawing.

The device is terminated by metal rings 27 and 29, which serve as terminals for the outer resistive layer 43. The metal core protrudes from one end of the device, thereby providing a contact 41 for the core. If the core is too bulky as a solid core, a cylindrical, hollow metal shell may be used instead.

The movable contact for the device is provided by a slidable ring-shaped member 31 which is in close contact with the outer surface of the outer shell 43. The ring 31 is provided with a terminal post 35.

As can best be seen in FIGURE 7, it is necessary to make sure that the various layers are not shorted together through the terminating caps 27 and 29. Therefore, insulating gaskets 51 and 53 are provided to isolate the metal core 41 and the inner resistive layer 45 from the outer resistive layer 43. A terminating gasket 39 further serves to prevent contact of the terminal 41 with the cap 27.

As mentioned above, it is sometimes necessary to provide an appropriate terminating resistance R (Equation 10) for the device. This can be accomplished by providing an appropriate cylindrical gasket member 49, whose resistance is given by Equation 10, in contact with the core 47 and the outer resistive layer 43, but not in contact with the inner resistive layer 45. The member 49 thus provides a resistance route from the layer 43 to the core 47, and eliminates the need for an external resistor. If, however, it is preferred to use an external terminating resistor, the members 49 and 51 may be integral with one another to form an insulating member.

A further practical embodiment of the invention is shown in FIGURES 9 and 10. In this embodiment the upper and intermediate resistive layers 19 and 21 shown in FIGURE 1 are provided by an integral structural block 55 which has stepped sectional geometry. To achieve the differences in resistivity of layers 19 and 21 shown in FIGURE 1, the block 55 is shaped so as to have a stepped portion 57. A metal strip 59 is attached to the end of the stepped portion 57. The block 55 and the metal strip 59 are mounted on an insulating base 63. A movable contact is provided by an arm 61. The arm 61 is mounted on a threaded shaft 62 which in turn is rotatably mounted on the base 63. A terminal post 65 is attached to the arm 61. Metal end terminals 70 are ohmically connected to the ends of the block 55. Of course, these metal terminals must not contact the metal strip 59. If need be, appropriate terminal posts may be attached to the terminals 70. The stepped geometry of the block 55 achieves the desired results because the width of the block 55 simulates the two layers of the resistive material. A two-layer device is therefore effectively achieved. As a practical matter, it is usually necessary to choose the resistance of the resistive member 55 (and correspondingly the resistive layers 21, 73 and 45 in FIGURES 1, 4 and 7 respectively) to be relatively high so that current drain from terminals 11 and 13 (FIGURE 1), 75 and 76 (FIGURE 4), 27 and 29 (FIGURE 7) and 70 (FIGURE 9), to conductive strip 23 (FIGURE 1), 74 (FIGURE 4), 47 (FIGURE 7) and 59 (FIGURE 9) respectively, is not excessive, i.e., the terminal or input resistance is not too low.

What I claim as my invention is:

1. A potentiometer comprising a first resistive layer, a second resistive layer in contact with said first resistive layer and having the same length as said first resistive layer, a conductive layer of the same length as said resistive layers and in contact with the second resistive layer but not in contact with said first resistive layer, a pair of terminals one connected to one end of said first resistive layer and the other to the other end of said first resistive layer, a third terminal connected to the conductive layer, a movable contact slidably engaging the first resistive layer and in electrical contact therewith.

2. A potentiometer as defined in claim 1, wherein the first and second resistive layers are each of uniform cross-section and uniform resistivity throughout their lengths.

3. A potentiometer as defined in claim 2, wherein the first resistive layer is integral with the second resistive layer, but of cross-section differing from that of the second layer.

4. A potentiometer as defined in claim 1, in which the first, the second and third terminals are adapted to be coupled to a first, a second and a third source of potential respectively, and the resulting voltage $V(x)$ appearing at the movable contact is given by the following equation $$V(x) = Ae^{\sqrt{\rho\sigma}x} + Be^{-\sqrt{\rho\sigma}x} + C$$

where:

the first source of potential $= (A+B+C)$ volts the second source of potential $= \left(Ae^{\sqrt{\rho\sigma}L} + Be^{-\sqrt{\rho\sigma}L} + C\right)$ volts the third source of potential $= C$ volts $\rho =$ resistance per unit length of the first resistive layer
$\sigma =$ conductance per unit length of the second resistive layer
$L =$ length of the first and second resistive layers
$x =$ distance of the movable contact from one of said ends of the first resistive layer, and where A, B and C are predetermined numbers.

5. A potentiometer comprising a relatively long, narrow resistive strip, a second long, narrow resistive strip of substantially the same length as said first resistive strip and in contact therewith, a conductive strip of substantially the same length as said resistive strips and in contact with the second resistive strip but not in contact with said first resistive strip, a pair of terminals one at each end of and connected to the first resistive strip, a terminal connected to the conductive strip, a movable contact slidably engaging the first resistive strip and in electrical contact therewith, the contact being movable over substantially the entire length thereof.

6. A potentiometer as defined in claim 5, in which the first, the second and third terminals are adapted to be coupled to a first, a second and a third source of potential respectively, and the resulting voltage $V(x)$ appearing at the movable contact is given by the following equation $$V(x) = Ae^{\sqrt{\rho\sigma}x} + Be^{-\sqrt{\rho\sigma}x} + C$$

where:

the first source of potential $= (A+B+C)$ volts the second source of potential $= \left(Ae^{\sqrt{\rho\sigma}L} + Be^{-\sqrt{\rho\sigma}L} + C\right)$ volts the third source of potential $= C$ volts $\rho =$ resistance per unit length of the first resistive layer
$\sigma =$ conductance per unit length of the second resistive layer
$L =$ length of the first and second resistive layers
$x =$ distance of the movable contact from one of said ends of the first resistive layer, and where A, B and C are predetermined numbers.

7. A potentiometer comprising a cylindrical metal core, a very thin inner resistive cylindrical shell surrounding the core and in contact therewith, a very thin outer resistive cylindrical shell surrounding the inner cylindrical shell and in contact therewith, the core and said shells being of equal length, a pair of terminals one at each end of and connected to the outer cylindrical shell and in electrical contact therewith, a contact connected to the metal core, a slidable contact engaging the outer shell and in electrical contact therewith and movable over substantially the entire length of the outer shell.

8. A potentiometer as defined in claim 7, in which the first, the second and third terminals are adapted to be coupled to a first, a second and a third source of potential respectively, and the resulting voltage $V(x)$ appearing at the movable contact is given by the following equation $$V(x) = Ae^{\sqrt{\rho\sigma}x} + Be^{-\sqrt{\rho\sigma}x} + C$$

where:

the first source of potential $= (A+B+C)$ volts the second source of potential $= \left(Ae^{\sqrt{\rho\sigma}L} + Be^{-\sqrt{\rho\sigma}L} + C\right)$ volts the third source of potential $= C$ volts $\rho =$ resistance per unit length of the first resistive layer
$\sigma =$ conductance per unit length of the second resistive layer
$L =$ length of the first and second resistive layers
$x =$ distance of the movable contact from one of said ends of the first resistive layer, and where A, B and C are predetermined numbers.

9. A potentiometer comprising a first resistive layer of uniform cross-section and uniform resistivity throughout its length, a second resistive layer of substantially the same length as the first resistive layer and of uniform cross-section and uniform resistivity throughout its length and in contact along a first plane surface with said first resistive layer, a conductive layer in contact along a second plane surface parallel to said first plane surface with said second resistive layer but not in direct contact with said first resistive layer, a first terminal connected to one end of the first resistive layer, a second terminal connected to the other end of the first resistive layer, a third terminal connected to the conductive layer, and a wiper in contact with the first resistive layer and movable along the length of the first resistive layer.

10. A potentiometer as defined in claim 9, wherein the first and second plane surfaces are of substantially the same area.

11. A potentiometer as defined in claim 10, wherein the wiper is in electric contact with the first resistive layer along a third plane surface parallel to said first and second plane surfaces.

12. A potentiometer as defined in claim 11, wherein the third plane surface is of substantially the same area as said first and second plane surfaces.

13. A potentiometer as defined in claim 12, additionally, including a resistor connected between said first and third terminals and having a resistance given by the equation $$R = \sqrt{\frac{\rho}{\sigma}}$$

where:
R is the said resistance,
$\sigma$ is the conductance per unit length of the second resistive layer along the first plane surface, and
$\rho$ is the resistance per unit length of the first resistive layer.

References Cited by the Examiner

UNITED STATES PATENTS

| | | | |
|---|---|---|---|
| 2,338,458 | 1/1944 | Schade | 338—176 X |
| 2,680,177 | 6/1954 | Rosenthal | 323—94 X |
| 3,061,807 | 10/1962 | Hollander | 338—176 |

OTHER REFERENCES

German printed application 1,003,326, February 1957, VEB Funkwerk.

JOHN F. COUCH, *Primary Examiner.*

A. D. PELLINEN, *Assistant Examiner.*